United States Patent

[11] 3,562,491

[72] Inventor Henry A. Branfield
 Chesham, England
[21] Appl. No. 676,470
[22] Filed Oct. 19, 1967
[45] Patented Feb. 9, 1971
[73] Assignee A. B. Dick Company
 Chicago, Ill.
 a corporation of Illinois

[54] MASTER CONTROLLED COPY COUNT METHOD AND APPARATUS
 34 Claims, 14 Drawing Figs.
[52] U.S. Cl. .................................................. 235/61.1,
 235/92; 101/132
[51] Int. Cl. .................................................. G06k 5/00,
 G06f 7/38; B41i 11/08
[50] Field of Search .......................................... 235/61.9,
 92(33); 101/91, 132.5, 322; 355/41, 42, 43, 40,
 112; 95/1

[56] References Cited
 UNITED STATES PATENTS

| | | | |
|---|---|---|---|
| 2,756,672 | 7/1956 | George .......................... | 101/144 |
| 2,953,087 | 9/1960 | Ritzerfeld et al. ............. | 101/132.5 |
| 3,013,486 | 12/1961 | Ritzerfeld et al. ............. | 101/132.5 |

Primary Examiner—Daryl W. Cook
Attorneys—Peter S. Lucyshyn and Brown, Jackson, Boettcher and Dienner

ABSTRACT: This invention relates to duplicator control units generally, and more particularly to a novel master controlled copy count method and apparatus for controlling automatically the number of copy sheets produced during the duplicating run of a duplicating machine in accordance with a code provided on a master sheet for such duplicating machine. In accordance with the method of this invention, the novel apparatus disclosed senses the code from the master sheet and controls either the programming circuit for the duplicating machine in accordance with a code-sheet count comparison or directly controls the sheet counter for the duplicating machine in accordance with the sensed code.

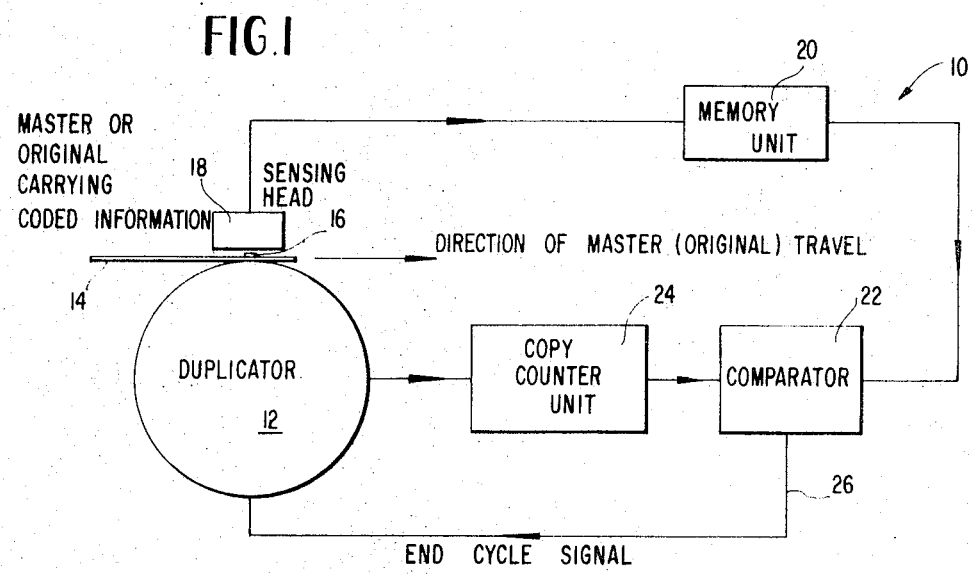
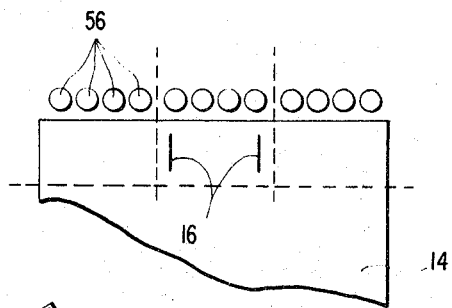
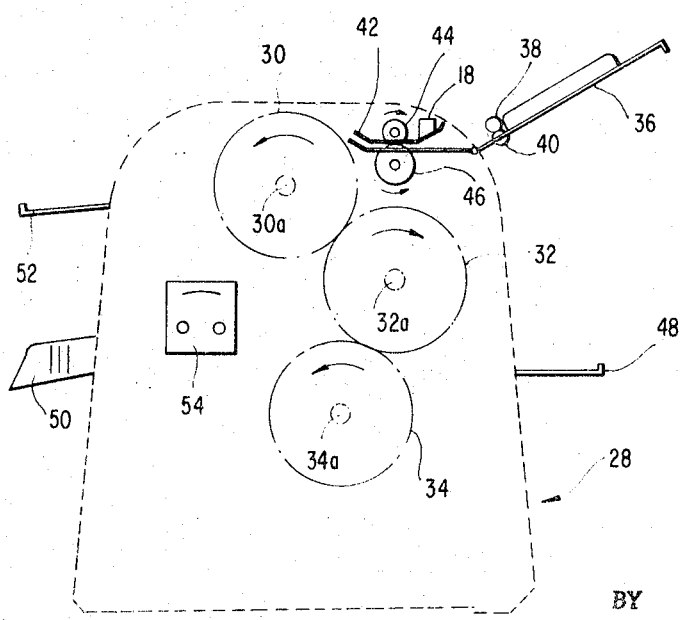
INVENTOR
HENRY A. BRANFIELD
BY Bartholomew Diggins
ATTORNEY

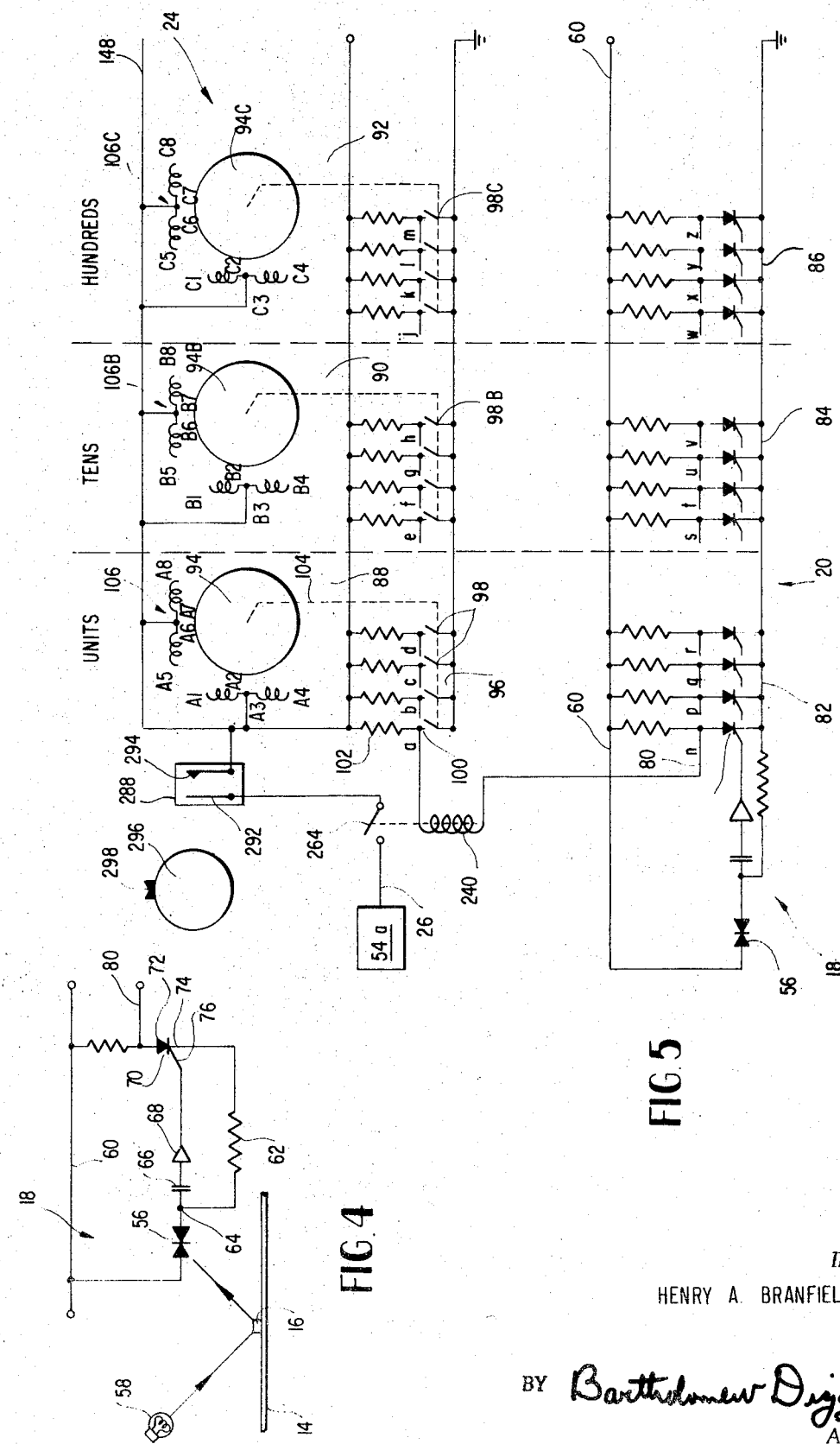

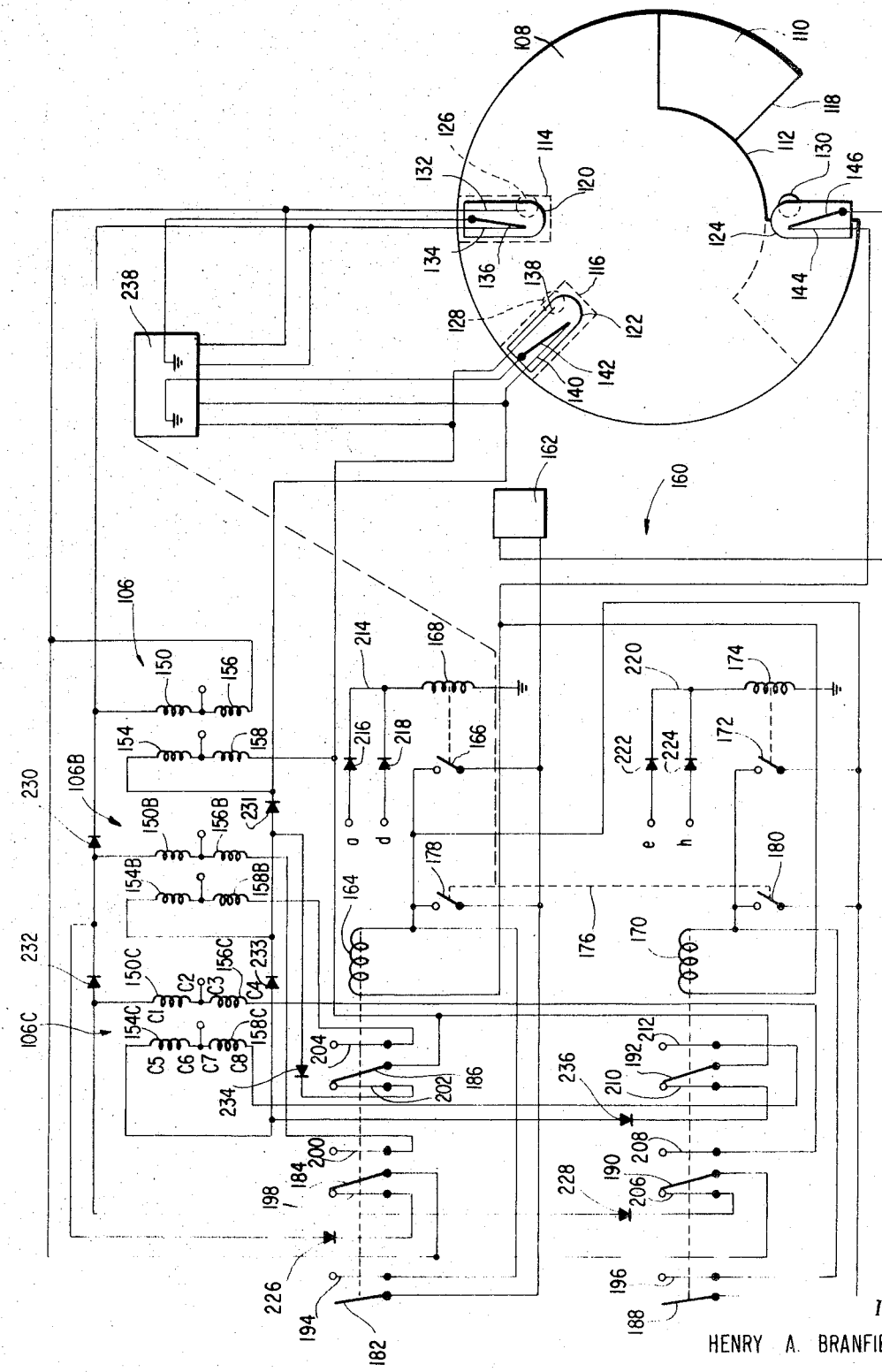

INVENTOR
HENRY A. BRANFIELD
BY Bartholomew Diggins
ATTORNEY

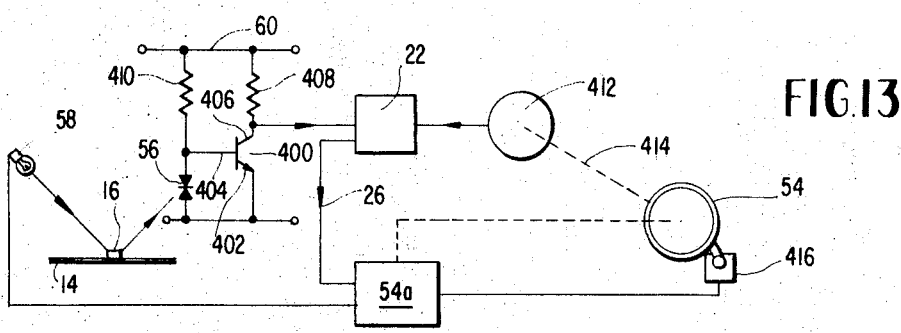
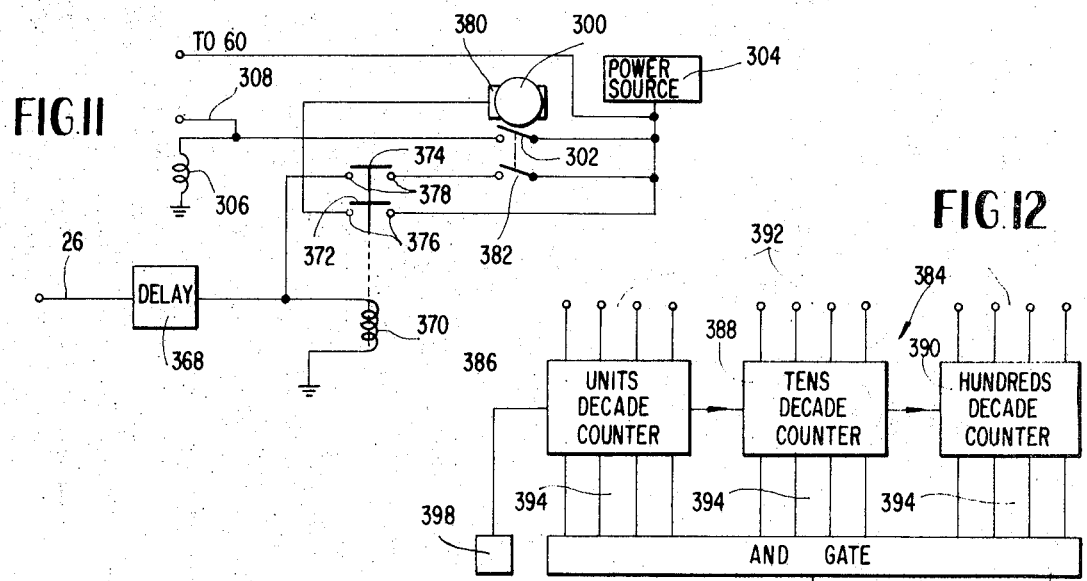
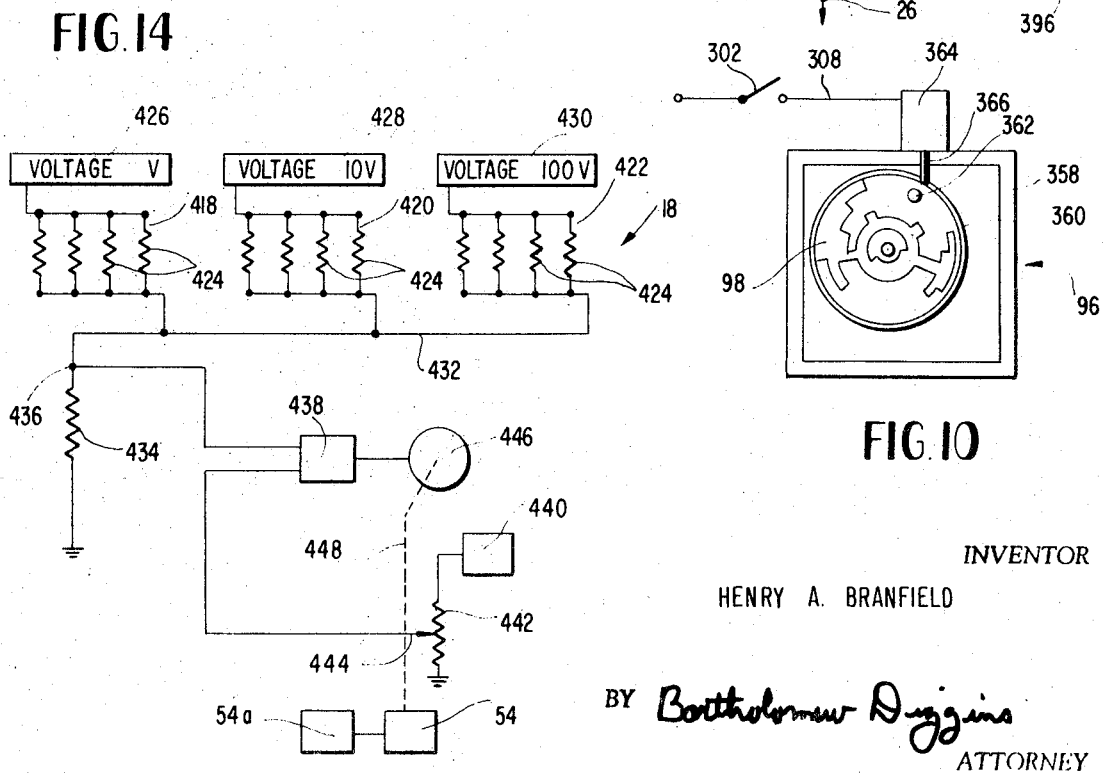
INVENTOR
HENRY A. BRANFIELD
BY Bartholomew Diggins
ATTORNEY

MASTER CONTROLLED COPY COUNT METHOD AND APPARATUS

Conventionally, the procedure for operating duplicating machines which produce a number of copy sheets from a single master involves the manual performance of a large number of sequential steps which are quite exacting and complicated. Recently, however, this operating procedure has been adapted to automation by providing programming units for the duplicating machines which normally operate under the control of a central counting system. This counting system programs the duplicating machine through the operational phases involved in completing a single printing run.

Unfortunately, most of the automated duplicating systems thus far developed require a manual operation to reprogram the counter control for the duplicating machine after each duplicating run is completed. More specifically, these automated duplicating machines include programming systems which must be reset after each master sheet is ejected from the machine, and therefore the programming system operates only for the printing run involving a single master sheet. Some more recently developed automated duplicating machines include a system for automatically feeding master sheets to the machine so that successive duplicating runs can be completed without interruption, but the preset programming system for these machines only permits the machine to print an equal number of copy sheets from each master. It is impossible, with such systems, to print a different number of copy sheets from each successive master automatically fed to the machine without manually setting the program control counter.

It is a primary object of this invention to provide a novel master controlled copy count unit for a duplicating machine which permits the machine to automatically reproduce varying numbers of printed copy sheets from successive masters fed thereto.

Another object of this invention is to provide a novel master controlled copy count unit which is universally adapted for use upon a number of different duplicating machines which employ a master sheet to control the production of a number of identical copy sheets.

A further object of this invention is to provide a novel master controlled copy count unit for duplicating machines which is adapted to control the copy output of such machines in accordance with a code provided upon the master sheets for the machines.

Another object of this invention is to provide a novel master controlled copy count unit for duplicating machines which is adapted to control the copy output of such machines in accordance with a binary code carried by the master sheet for the machine.

A further object of this invention is to provide a novel master controlled copy count unit for duplicating machines which is adapted to sense a code provided upon the leading edge of a master sheet and to control the copy output of such machine in accordance with the sensed code.

Another object of this invention is to provide a novel method for automatically varying the copy output of a duplicating machine for successive duplicating runs made with different master sheets.

A further object of this invention is to provide a novel method for controlling the copy output of an offset lithographic duplicating machine from a master which is coded in a manner which will not affect the reproduction printed upon copy sheets made from such master.

A still further object of this invention is to provide a novel master controlled copy count unit for automated duplicating machines which enables such machines to operate rapidly and effectively with a minimum of operator supervision.

The foregoing and other objects of the invention will become apparent upon a consideration of the following specification and appended claims taken in conjunction with the accompanying drawings in which:

FIG. 1 is a block diagram illustrating the master controlled copy count unit of the present invention;

FIG. 2 is a diagrammatic illustration in side elevation of an offset lithographic duplicating machine which employs the master controlled copy count unit of the present invention;

FIG. 3 illustrates a coded master sheet for use with the sensing head for the master controlled copy count unit of the present invention;

FIG. 4 is a schematic diagram of a portion of the sensing circuit for the master controlled copy count unit of the present invention;

FIG. 5 is a schematic diagram of the master controlled copy count unit of the present invention;

FIG. 6 is a schematic diagram of the stepping motor control system for the master controlled copy count unit of the present invention;

FIG. 10 is a sectional view of a printed circuit switching assembly for the counter unit of the master controlled copy count unit of the present invention;

FIG. 11 is a schematic diagram of an embodiment of the reset unit for the stepping motor control system of FIG. 6;

FIG. 12 is a block diagram of a binary coded decimal counter unit for an embodiment of the master controlled copy count unit of the present invention;

FIG. 13 is a schematic diagram of an embodiment of the master controlled copy count unit of the present invention; and FIG. 14 is a schematic diagram of still another embodiment of the master controlled copy count unit of the present invention.

Figure 9:
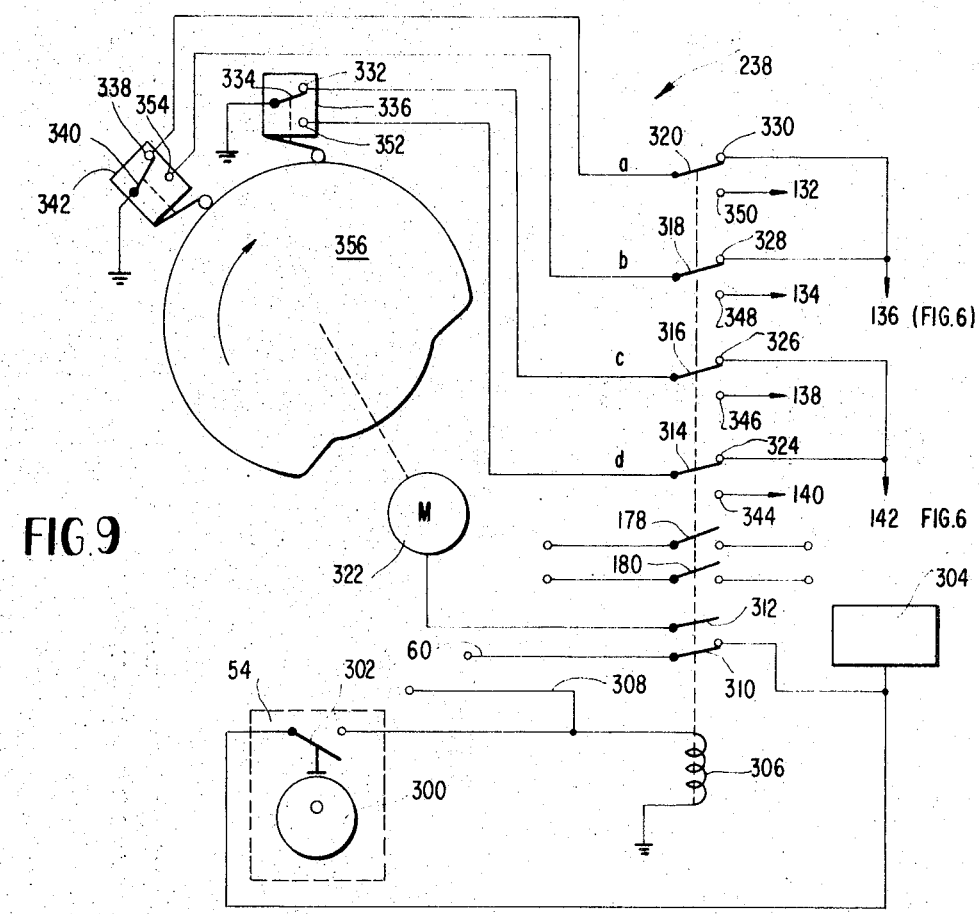
FIG. 9 is a schematic diagram of the reset unit for the stepping motor control system of FIG. 6.

The master controlled copy count unit of the present invention may be effectively employed with a wide variety of duplicating machines wherein a reproduction from a master card or sheet is produced upon a plurality of copy sheets fed through the machine. In machines of this type, it is desirable to automatically feed sequential masters through the machine and to reproduce varying numbers of copy sheets from each master. The master controlled copy count unit of the present invention may be beneficially employed to achieve this end.

The construction and operation of a basic embodiment of the master controlled copy count unit of the present invention may be best understood by reference to FIG. 1, wherein the copy count unit indicated generally at 10 is illustrated for use in connection with a duplicator 12. For purposes of this description, the duplicator 12 may constitute any suitable machine for reproducing upon copy sheets passing through the duplicator information from an original or master sheet 14.

The master sheet 14 to be fed into the duplicator 12 is provided with a code 16 which controls the number of copy sheets to be reproduced from the master by the duplicator. This code must cause corresponding pulses to be emitted from a sensing head 18, and may constitute marks of magnetic ink, holes in the master through which light is projected to trigger the sensing head, dark marks which are sensed by a photosensitive unit, or other suitable code means well known to the prior art which operate to cause a sensing unit to emit corresponding output pulses.

The sensing head 18 is positioned upon the duplicator 12 to sense the code 16 on an incoming master, and this code is then transferred by the sensing head to a memory unit 20. The memory unit stores the coded input from the sensing head, and is connected to one side of a comparator unit 22. Also connected to the comparator unit is a copy counter unit 24 which counts the number of copy sheets fed through the duplicator after the master 14 is positioned in place within the duplicator. The comparator unit operates to compare signals from the copy counter unit 24 which are indicative of the sheet count with the coded signals stored in the memory unit 20, and, when equalization is reached, the comparator unit provides an output signal. Thus, when the copy counter unit 24 registers the number of copy sheets previously indicated by the code 16, the comparator unit 22 will provide an output signal to the duplicator 12 by means of a line 26. This output signal may operate as a trigger actuating signal for known duplicator programming systems to either terminate the operation of the duplicator 12 or to replace the master 14 with a new master and thereby institute a new duplicating cycle.

It will be apparent from a consideration of FIG. 1, that the master controlled copy count unit 10, in operation, is intended to control the number of copies produced by a duplicating machine in accordance with a code provided upon the master or original. This function of the device is of great importance when considered in light of recent trends toward the automation of offset duplicating equipment which have resulted in the development of programmed offset duplicating machines wherein a plurality of offset masters can be sequentially fed into the duplicating machine to accomplish a continuing, completely automated duplicating operation. These developments in offset automation render it particularly desirable to adapt the master controlled copy count unit 10 for use with a program controlled offset duplicating machine. Therefore, an embodiment of the master controlled copy count unit of the present invention particularly designed for use in offset duplicators will be hereinafter considered.

Referring now to FIG. 2, it will be noted that an offset lithographic duplicating machine indicated generally at 28 includes a master cylinder 30, a blanket or offset cylinder 32, and an impression cylinder 34. The master, blanket and impression cylinders are mounted for rotation by cylinder shafts 30a, 32a and 34a.

The master cylinder is adapted to carry an offset master sheet, which may be formed from paper, aluminum or similar thin sheet material. In operation, a clamp (not shown) is provided upon the surface of the master cylinder to receive the clamp the leading edge of the master sheet to retain the sheet on the cylinder.

In automated offset duplicating machines, a number of various units known to the art may be employed to automatically feed the master sheet to the master cylinder 30, but for purposes of illustration, the offset duplicator 28 is provided with a master storage tray 36. This master storage tray is designed to hold a plurality of lithographic master printing sheets, and at controlled intervals, an individual sheet is removed from the stack on the storage tray by two feed rollers 38 and 40. These feed rollers move the individual master selected into a forwarding unit 42 where the master is retained until a new duplicating cycle is initiated by the program control unit for the duplicating machine. At this time, master forwarding rollers 44 and 46 are activated by the program control unit to feed the master into the clamp on the master cylinder 30. At the same time, the program control unit for the duplicator activates the clamp so that the master is automatically clamped to the master cylinder.

The duplicating machine 28 operates in a manner conventional to offset lithographic duplicating machines, and certain areas of the master are adapted to accept lithographic ink which is fed to master cylinder. The nonimage areas of the master are adapted to accept water or water base moistening solution which repels this lithographic ink. The ink which is applied to the master on the master cylinder is then transferred to the blanket cylinder 32 and copy sheets from a copy sheet storage tray 48 are then automatically fed between the blanket cylinder and the impression cylinder. The ink image on the blanket cylinder is thereby transferred to these copy sheets which are subsequently ejected into a sheet receiving tray 50.

As each copy sheet is fed into the duplicating machine, the impression cylinder 34 moves into contact with the blanket cylinder 32, and an impression cylinder latch and other operating mechanisms for the impression cylinder (not shown) oscillate with each movement of the impression cylinder. (see U.S. Pat. No. 2,860,577 to Wallace R. Fowlie issued Nov. 18, 1958).

At the termination of the individual duplicating cycle associated with a particular master, the master sheet is automatically ejected from the master cylinder 30 into a master sheet receiving tray 52, and the machine is then programmed through a postduplicating cycle and a new preduplicating cycle to prepare the machine for a subsequent duplicating operation. This machine programming can be accomplished under the control of a program counter unit 54 which activates various electrical circuits in a programming system 54a to sequentially energize and deenergize the operating mechanical components of the duplicating machine 10. Automated offset duplicators of this general type are known to those skilled in the art.

Referring now to FIGS. 2, 3 and 4, it will be noted that the sensing head 18 of the master controlled copy count unit of the present invention is positioned on the duplicating machine 28 to sense the master sheet as it enters the master forwarding unit 42. It must of course be understood that the master sensing unit can be positioned in a number of positions on the duplicating machine to sense indicia on the incoming master sheet.

Although, as has been previously recognized, the master sensing unit can be adapted to sense coded information in a number of forms, as for example, magnetic ink markings, deposited electroconductive materials, or sensed codes of a plurality of other well know forms, the particular master sensing unit illustrated in FIG. 2 includes a plurality of lamp-photodiode assemblies, one of which is illustrated in FIG. 4. Each such lamp-photodiode assembly includes a photodiode 56 which is positioned to receive light projected from a light source 58 and reflected onto the photodiode from the code 16 on the master sheet 14. For purposes of illustration, the code 16 may be formed across the top of the master sheet, as illustrated in FIG. 3, by means of suitable ink markings which will reflect the light beam from the light source 58. Although any suitable code may be employed, the master controlled copy count unit to be hereinafter described is designed for use with a binary-coded decimal code wherein a mark represents a "1" and no mark represents an "0." Furthermore, although it is obvious that a larger or smaller number of decimal places may be employed, the master controlled copy count unit shown in FIGS. 5—8 is adapted for use with a binary code having a units, tens and hundreds column. This code is a conventional binary code, and its decimal equivalents are as follows:

| Decimal | Binary-coded decimal |
|---------|----------------------|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

The type of coded information employed to encode the master sheet 14 will, to some extent, determine the structural configuration of the sensing head 18 employed with the master controlled copy count unit. For example, for some applications it might be beneficial to longitudinally code along the side edges of the master sheet instead of horizontally across the top edge as illustrated in FIG. 3. Obviously, when a longitudinal code is employed, the sensing unit 18 might not include a plurality of sensing assemblies to simultaneously sense the code on the master sheet, but conversely might include a single sensing assembly to sequentially sense the code provided along the longitudinal edge of the sheet.

A binary code is particularly well adapted for use on offset lithographic masters, for in use, the leading edge of a lithographic master is passed beneath the master clamping unit on the master cylinder of the duplicating machine. Therefore, by coding the leading edge of the lithographic master as illustrated in FIG. 3 with a binary code, the coded portion of the master is covered by the master cylinder clamp during the duplicating operation, and there is no opportunity for this coded material to be accidentally reproduced upon the copy sheets passing through the machine. This is extremely important for offset lithographic applications, for if a code along the longitudinal edges of the master were employed, it is quite possible that the coded information would be reproduced on each copy sheet passing from the machine. Therefore, the method of coding across the leading edge of an offset lithographic master and providing a sensing head adapted to sense such a code forms an important part of the present invention.

It will be noted from FIG. 3 that when the master sheet 14 is coded with the binary code indicated, the coded material is arranged in a units, tens and hundreds column with each column including four binary code spaces. Thus, the sensing head 18 employed to sense this code includes 12 individual lamp-photodiode assemblies of the type illustrated in FIG. 4; one for each code space.

When a code mark 16 passes between the light source 58 and the photodiode 56, the light reflected to the photodiode is changed, thereby causing a resultant change in the resistance of the photodiode. The photodiode 56 is connected to a power line 60 which is in turn connected to a suitable voltage source, not shown. The photodiode is also connected to form part of a series resistor circuit which includes a resistor 62. Thus, when the resistance of the photodiode changes, a resultant voltage change occurs at the resistor-photodiode junction 64. The voltage signal caused by this variation in voltage at junction 64 is capacitor coupled by a capacitor 66 to an amplifier 68, and this amplifier, which may constitute a transistor pulse amplifier, provides an amplified output signal to a silicon controlled rectifier (SCR) 70.

The circuit including the SCR 70, to be hereinafter described, forms a portion of the memory unit 20. The memory unit includes one SCR circuit of the type illustrated in FIG. 4 for each lamp-photodiode assembly. The SCR 70 has an anode electrode 72, a cathode electrode 74, and a gate electrode 76, with the conventional forward direction of conduction across the SCR being from anode to cathode. However, due to the operating characteristics of the SCR, current flow will normally be blocked in both the forward and reverse directions through the SCR within the breakdown voltage range of the device. In this blocking state, the SCR is cutoff, but a positive trigger voltage of relatively low potential applied to the gate 76 will be sufficient to cause the SCR to conduct from anode to cathode with substantially no impedance when a potential is applied to the anode. The SCR will then continue to conduct in this forward direction until the forward potential applied to the anode is reduced substantially to zero or until a reverse bias is applied to overcome the forward potential. The conduction of the SCR is not affected by removing the potential from the gate 76, once forward conduction has been initiated.

The anode 72 of the SCR 70 is connected by means of an anode resistor 78 to the power line 60, while the gate 76 is connected to receive the output signals from the pulse amplifier 68. The cathode 74 of the SCR is connected to ground potential, so that, upon reception of the signal from the pulse amplifier 68, the SCR is switched to a forward conducting state. With the SCR in this conducting condition, an output signal may be obtained from an anode output terminal 80.

Referring now to FIG. 5, it will be noted that the SCR 70 of FIG. 4 is one of a plurality of SCR's which are connected to form the memory unit 20. Each SCR in the memory unit is connected to a photodiode circuit of the type illustrated in FIG. 4, but for purposes of illustration, only one such associated photodiode circuit is illustrated in FIG. 5. The SCR's forming the memory unit 20 are divided into decade groups to form a units decade 82, a tens decade 84, and a hundreds decade 86 for the memory unit. Each decade is composed of four columns, and thus, the memory unit is provided with divisions which correspond to the binary code on the leading edge of the master sheet to be sensed.

In the operation of the memory unit 20, the photodiode 56 will change resistance if a code mark is present on the master sheet being sensed. This change in resistance causes a gate signal to occur at the gate of the associated SCR, causing the SCR to conduct in a forward direction from the power source 60. In the absence of a mark on the master sheet, no gate signal is produced by the photodiode and the associated SCR remains cutoff. Thus, it may be seen that a conducting SCR in the memory unit 20 indicates a mark, while a nonconducting SCR indicates a zero in the binary code. The code information in the memory unit may be taken from the anode output 80 of any individual SCR circuit and these anode outputs are designated in FIG. 5 as $n$, $p$, $q$, and $r$ for the units decade, $s$, $t$, $u$, and $v$ for the tens decade, and $w$, $x$, $y$, and $z$ for the hundreds decade.

The copy count unit indicated generally at 24 in FIG. 5 consists of three basically identical units 88, 90 and 92; one for each decade of the memory unit 20. For purposes of description, the units decade 88 of the copy count unit will be described, it being understood that this description also applies to the identical tens and hundreds decades 90 and 92 wherein like components will be identified with the suffix B for the tens and C for the hundreds decade.

Each of the decades 88, 90 and 92 consists of a stepping motor 94 and a printed circuit switching assembly 96 including a plurality of switches 98, each having a switch contact 100 arranged to give an output in binary coded decimal code. In the operation of the copy count unit, a closed switch contact represents a coded "1" and an open contact a "0." When any one of the switches 98 is closed, a circuit is completed across an associated series resistor in a resistor bank 102 and thereby an output is provided at the output contact 100. The outputs in the units, tens and hundreds decades of the copy count unit 24 are lettered $a$, $b$, $c$, $d$, $e$, $f$, $g$, $h$, $i$, $j$, $k$, $l$, $m$, and $n$ in FIG. 5.

Each stepping motor is provided with an output shaft 104 which is connected either mechanically or otherwise to selectively operate the printed circuit switches 98 in the particular decade of the copy count unit controlled by the stepping motor. The stepping motors each include a plurality of stepping motor windings indicated generally at 106 having eight winding terminals A1—A8 for the units decade 88, B1—B8 for the tens decade 90, and C1—C8 for the hundreds decade 92. The application of voltages to the stepping motor windings 106 in the correct sequence causes the output shaft 104 of the stepping motor to rotate in a series of discrete steps. This applied voltage sequence is so arranged that each time the offset duplicating machine 28 prints a copy sheet, a stepping motor rotates and advances one or more printed circuit switches one digit.

Figure 7:
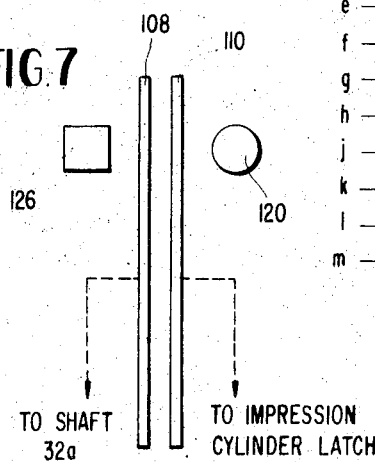
FIG. 7 is a diagrammatic illustration of the mechanical control components for the stepping motor control system of FIG. 6.

The operation of the stepping motor 94 may best be understood by references to FIGS. 6 and 7, wherein the drive system for the stepping motors is illustrated in detail. The desired pulse sequence for driving the stepping motors 94 is derived from the blanket cylinder 32 of the offset duplicating machine 28. The blanket cylinder completes one cycle of rotation for each copy sheet printed by the offset duplicating machine, and a disc 108 is suitably connected to the shaft 32a of the blanket cylinder to rotate with the blanket cylinder. This disc may be directly mounted upon the shaft 32a or may be otherwise driven thereby.

A second disc 110 is mounted substantially coaxially with the disc 108, and this disc constitutes a disc which moves through a small angle between two defined positions. The disc 110 moves from a closed to an open position only when the duplicating machine 28 is printing and feeding paper, and is driven by a suitable driving mechanism, indicated by broken lines in FIG. 7, which is connected to a part of the duplicating machine which moves only when the machine is printing and feeding paper. For example, the disc 110 may be driven from the impression cylinder latch or from other parts of the duplicating machine which oscillate or move when the impression cylinder 34 moves into contact with the blanket cylinder 32 to print copy sheets. It is also obviously possible to drive the disc 110 in response to known copy sheet sensing units which sense the presence of a copy sheet to be printed. The main requirements for the disc 110 are that it travel between two defined positions and maintain one position when the machine is printing and one position when the machine is not printing.

The discs 108 and 110 form magnetic shields, and may be composed from ferrous material or other suitable magnetic shielding material. Each disc is provided with specially positioned cutaway sections at the periphery thereof; the disc 108 being provided with a single cutaway section 112 while the disc 110 includes cutaway sections 114, 116 and 118. These cutaway sections are designed to coincide with magnetically operated electrical switches 120, 122 and 124 which are spaced about the periphery of the discs and are suitably mounted upon the duplicating machine 28. Mounted opposite each of the switches 120, 122 and 124 is a magnetic actuator for the switch, as indicated at 126, 128 and 130. The discs 108 and 110 separate the magnetic switches and the magnetic actuators therefor, as illustrated in FIG. 7.

As an alternative, the disc 110 need not form a magnetic shield but can instead be formed of nonmagnetic material so that the magnetic actuators 126, 128 and 130 can be mounted thereon. The disc 110 could then be solid, and the magnetic actuators would be mounted on the disc in the position of the cutaway sections 114, 116 and 118 of FIG. 7.

The magnetically operated switches 120 and 122 are identical in construction. The switch 120 includes stationary switch contacts 132 and 134 which are positioned upon either side of a central switch arm 136, while the switch 122 includes stationary contacts 138 and 140 positioned upon either side of a central switch arm 142. Normally, when the discs 108 and 110 shield the switches 120 and 122 from the actuating magnets 126 and 128, the switch arm 136 will contact the switch contact 134 while the switch arm 142 will contact the switch contact 140.

The switch 124 is a single contact switch having a stationary switch contact 144 and a switch arm 146. Normally, the switch arm 146 will contact the switch contact 144 unless the switch is operated by the actuating magnet 130.

It will be noted that the winding terminals A1, A4, A5 and A8 for the stepping motor 94 in the units decade are electrically connected to the switches 120 and 122, with the terminal A1 being connected to the switch contact 134, the terminal A4 being connected to the switch contact 132, the terminal A5 being connected to the switch contact 140 and the terminal A8 being connected to the switch contact 138. Both the switch arms 136 and 142 are directly connected to ground, so it will be appreciated that the switches 120 and 122 operate to selectively complete a circuit through specific stepping motor windings to ground.

In the operation of the stepping motors for the units, tens and hundreds decades of the copy count unit, it will be noted that operating power is furnished from a power source 148 to the stepping motor winding terminals A2—A3, A6—A7, B2—B3, B6—B7, C2—C3 and C6—C7. As a copy sheet is fed into the duplicating machine, the disc 110 is oscillated to the position shown in FIG. 6, so that the cutaway sections 114 and 116 therein align with and expose switches 120 and 122. Initially, however, these switches are still shielded from their actuating magnets 126 and 128 by the disc 108 which is rotating with the blanket cylinder 32 in a counterclockwise direction in FIG. 6. Therefore, the switch arms 134 and 142 remain in their normal position against the switch contacts 134 and 140, and power flows from the power source 148 across individual stepping motor windings 150 and 152 which extend between the winding terminals A2 and A1 and A6 and A5. The energization of these stepping motor windings results from the completion of circuits from the motor winding terminal A1 through the switch contact 134 and the switch arm 136 to ground and from the motor winding terminal A5 through the switch contact 140 and the switch arm 142 to ground.

As the disc 108 continues to rotate in a counterclockwise direction with the rotation of the blanket cylinder 32, the forward edge of the cutaway section 112 first passes over the actuating magnet 126, and the switch arm 136 moves into contact with the switch contact 132. The circuit to the stepping motor winding terminal A1 is now broken, the winding 150 is deenergized, and a new circuit is completed to the stepping motor winding terminal A4. While the motor winding 154 remains energized, a motor winding 156 which extends between the winding terminals A3 and A4 is now also energized by a circuit extending from the power source 148 through the winding 156, the switch contact 132, and the switch arm 136 to ground.

Next, the leading edge of the cutaway portion 112 passes over the actuating magnet 128, and the switch arm 142 for the switch 122 moves from the contact 140 to the switch contact 138. While the motor winding 156 remains energized, the circuit for the winding 154 is broken and a new circuit is completed from the switch arm 142 through the contact 138 to the motor winding terminal A8. Thus, a stepping motor winding 158 which extends between the winding terminals A7 and A8 is energized from the voltage source 148.

Subsequently, as the disc 108 continues to rotate, the trailing edge of the cutaway portion 112 passes the actuating magnet 126 and the switch arm 136 breaks contact with the contact 134 and reengages the switch contact 132. This results in the reenergization of the motor winding 150, while the motor winding 158 remains energized.

Finally, as the trailing edge of the cutaway portion 112 passes the actuating magnet 128, the switch arm 142 moves from the contact 140 to the switch contact 138, thereby deenergizing the motor winding 158 and reenergizing the motor winding 154. This completes the operational sequence performed during one cycle of rotation of the blanket cylinder 32, with the exception that at the termination of each cycle of rotation, the cutaway portion 112 in the disc 108 passes by the magnetic actuator 130 for the switch 124. This results in the normally closed contact between the switch arm 146 and the switch contact 144 being broken for a short period at the end of each cycle of rotation of the disc 108 for a purpose to be subsequently described.

At the termination of copy sheet feeding in the duplicating machine 28, the disc 110 moves to its initial position to shield the switches 120, 122 and 124 from the actuating magnets 126, 128 and 130. Thus, even though the blanket cylinder 32 and the disc 108 continue to rotate, the switches 120, 122 and 124 will not be actuated until the duplicating machine begins to again print paper.

Reviewing the operation of the stepping motor windings 150, 154, 156 and 158 under the control of the discs 108 and 110, it will be noted that for one revolution of the blanket cylinder and one revolution of the disc 108, circuits are completed in sequence to the following stepping motor winding terminals:

A1 and A5

A4 and A5

A4 and A8

A1 and A8

A1 and A5

This represents one binary step, and causes the stepping motor 94 in the units decade 88 to set a binary one into the units switch assembly 96. As a binary one is 0001, the last switch in the units switch assembly will be closed, and power from the power source 148 will flow across the last resistor in the resistor bank 102 to provide an output at the output $d$. As the blanket cylinder 32 continues to rotate to print subsequent copy sheets, the circuits are sequentially completed to the stepping motor winding terminals for the units stepping motor 94 in the order previously indicated, and subsequent binary numbers are set into the switch assembly 96 until a binary nine is reached. At this point, an output signal is developed across the first and last resistors in the units resistor bank 102, and this output signal is felt at the outputs $a$ and $d$. The tens stepping motor 94B is now energized.

The stepping motor coils for the stepping motors 94B and 94C of the tens and hundreds decades 90 and 92 are energized in the same sequence as were the stepping motor coils for the units stepping motor 94. However, the tens decade stepping motor 94B registers only one binary count for each 10 rotations of the blanket cylinder 32 during copy sheet printing, while the hundreds decade stepping motor 94C registers only one binary count for each 100 rotations of the blanket cylinder. To achieve this counting sequence, a relay circuit, indicated generally at 160 in FIG. 6, is employed to control the count of the tens and hundreds stepping motors.

The relay circuit 160 includes an AC power source 162 which may be connected across a first relay actuating coil 164 by means of a switch 166 operated by a coil 168. The power source 162 is also connected across a second relay operating coil 170 by a switch 172 operated by a coil 174. Additionally, the power source 162 can be simultaneously connected across the coils 164 and 170 by means of a ganged reset switch 176 having switch arms 178 and 180.

The circuit between the power source 162 and the relay operating coils 164 and 170 can be broken by opening the normally closed switch 124, for the switch arm 146 thereof is connected to the power source 162 while the stationary contact 144 is electrically connected to the relay operating coils 164 and 170.

The relay operating coil 164 is connected to operate ganged relay switch arms 182, 184 and 186 while the relay operating coil 170 is connected to operate ganged relay switch arms 188, 190 and 192. The switch arms 182 and 188 cooperate with single stationary switch contacts 194 and 196, while the switch arms 184, 186, 190 and 192 move between dual switch contacts indicated respectively at 198, 200, 202, 204, 206, 208, 210 and 212.

The switch operating coil 168 is energized by an AND gate 214 formed by diodes 216 and 218; the cathodes of which are connected respectively to the $a$ and $d$ outputs of the units decade in FIG. 5. Similarly, the switch actuating coil 174 is connected to a second AND gate 220 formed by diodes 222 and 224; the cathodes of which are respectively connected to the $e$ and $h$ outputs of the tens decade 90. These AND gates sense the presence of a binary nine (1001) formed by closing the first and last switches in the switching assemblies 96 and 96B of the tens and units decades. This, as previously explained, creates an output signal at the output $a$ and $d$ and also at the outputs $e$ and $h$, and this output signal, when present at both the diodes causes the AND gate to energize the switch operating coil associated therewith. If an output signal (binary one) is present at only one of the diodes in the AND gate, no signal will be present at the associated switch operating coil to close the switch arm 166 or 172.

The energization of the relay operating coil 164 brings the stepping motor 94B of the tens decade into the counting circuit while the operation of the relay operating coil 170 brings the stepping motor 94C of the hundreds decade into the counting circuit. Considering first the tens stepping motor, it will be recalled that the sequence by which the units decade stepping motor processes a binary count into the switches 98 has been previously described. Upon the ninth rotation of the blanket cylinder 32, a binary nine (1001) will be set into the switching assembly 96 and an output voltage appears at the outputs $a$ and $d$ of the units decade 88. This output voltage passes across the diodes 216 and 218 of the AND gate 214 and energizes the switch operating coil 168 to close the switch arm 166. This completes the circuit from the AC power source 162, across the switch arm 166, the relay operating coil 164, and the normally closed switch 124 to energize the relay operating coil. With the energization of the relay operating coil, switch arm 182 completes a holding circuit for the relay operating coil from the power source 162 to the switch contact 194, the relay operating coil 164, and the switch 124. Also, the switch arm 184 moves from the switch contact 198 to the switch contact 200, while the switch arm 186 moves from the switch contact 202 to the switch contact 204. It will be noted that the switch arm 184 is connected to the stationary contact 132 of the magnetically operated switch 120, while the switch arm 186 is connected to the stationary contact 140 of the magnetically operated switch 122. Also, the relay contact 200 is connected to the winding terminal B4 for the stepping motor winding 156B while the relay switch contact 204 is connected to the winding terminal B8 for the stepping motor winding 158B.

As the blanket cylinder 32 moves the disc 108 through a 10th cycle of rotation, the operation sequence previously described in connection with the stepping motor windings 150, 154, 156 and 158 now also occurs with respect to the stepping motor windings 150B, 154B, 156B and 158B. Initially, with the switch arms 136 and 142 in contact with the switch terminals 134 and 140, a circuit is completed across the stepping motor winding 150B to the terminal B1 and then across the diode 230 to the switch terminal 134, while a second circuit is simultaneously completed across the stepping motor winding 154B to the winding terminal B5 and across a diode 231 to the stationary contacts 140.

Next, as the switch arm 136 breaks the circuit to the contact 134 and moves to the contact 132, the winding 150B becomes deenergized and a circuit through the stepping motor winding 156B is completed to the winding terminal B4, the relay contact 200 and the relay switch arm 184, to the switch contact 132.

Subsequently, when the switch arm 142 moves from the contact 140 to the contact 138, the stepping motor winding 154B is deenergized and a circuit for the stepping motor winding 154B is completed to the winding terminal B8, the relay contact 204, the switch arm 186, and the switch contact 138.

Finally, the disc 108 completes the cycle of rotation to sequentially permit first the switch arm 136 to return to the contact 134 and subsequently the switch arm 142 to return to the contact 140. This first deenergizes the stepping motor winding 156B and reenergizes the stepping motor winding 150B, and subsequently deenergizes the stepping motor winding 158B and reenergizes the stepping motor winding 154B. The sequence of winding terminals energized during each tenth rotation of the disc 108 is the same as each unit sequence previously described, and is as follows:

B1 and B5

B4 and B5

B4 and B8

B1 and B8

B1 and B5

In completing its cycle of rotation, the leading edge of the aperture 112 in the disc 108 moves past the actuating magnet 130 and causes the switch arm 146 to move away from the switch contact 144. This breaks the holding circuit for the relay actuating coil 164, and the switch arm 182 moves away from the contact 194, while the switch arms 184 and 186 recontact the terminals 198 and 202 respectively.

During each 10th cycle of rotation of the disc 108, the stepping motor 94 of the units decade 88 operates to clear the switch assembly 96 so that the signal across the AND gate 214 is removed. Thus, when the holding circuit at the relay contact 194 is broken by the opening of the switch 124, the relay actuating coil 164 is deenergized and remains so until the units decade again registers a binary nine output. With the relay switch arms 184 and 186 in contact with the terminals 198 and 202, the stepping motor windings 150B and 154B will be energized either directly or through the relay switch arms 184 and 186 during each binary step of the units decade stepping motor 94, but as the same coils are energized throughout the binary step, no movement of the stepping motor 94B occurs.

The second part of the relay circuit 160, which is controlled by the relay operating coil 170, operates identically to the portion of the relay circuit controlled by the relay operating coil 164. The relay coil 170 cannot become energized until a binary nine is present at the output of the units decade 88 and a second binary nine is present at the output of the tens decade 90. When a binary nine is set into the switching assembly 96B of the tens decade, an output signal occurs at the output $e$ and $h$ thereof, and this output signal is sensed by the diodes 222 and 224 of the AND gate 220. The output signal from the AND gate energizes the switch operating coil 174 to close the switch 172, but the relay operating coil 170 cannot become energized unless the relay operating coil 164 is also energized. Power for the relay operating coil 170 passes from the power input 162 through the switch 166, and, in the absence of a binary nine at the AND gate 214, the switch 166 would break the circuit to the relay operating coil 170. From the switch 166, energizing power passes through the switch 174 to the relay operating coil 170, and the energized coil 170 moves the switch arm 188 into contact with the contact 196 to establish a holding circuit across the relay operating coil. Also, energization of the relay operating coil 170 results in the relay switch arm 190 moving away from the contact 206 into contact with the contact 208 and the relay switch arm 192 moving away from the contact 210 into contact with the contact 212. With the relay switches in this position, it will be seen that upon each 100th rotation of the blanket cylinder 32, the stepping motor windings 150C, 154C, 156C and 158C will be energized in the same manner as were the stepping motor windings 150B, 154B, 156B and 158B. The circuit for the stepping motor winding 150C will be completed through diodes 230 and 232, while the circuit for the stepping motor winding 156C will be completed through the relay contact 208, the relay switch arm 190, and a diode 234. The circuit for the stepping motor winding 158C will be completed through the relay contact 212, the relay switch arm 192 and a diode 236. The diodes 226, 228, 230, 231, 232, 233, 234, and 236 prevent spurious operation of the stepping motors 94, 94B and 94C.

When the copy counter unit 24 has registered the desired number of sheet counts, a reset signal will be provided to a reset unit 238, which is in turn connected to the ganged reset switch 176 and operates to close switch terminals 178 and 180. With the reset switch 176 closed, power is simultaneously provided from the power source 162 to energize the relay actuating coils 164 and 170. The reset unit 238 is electrically connected to each of the switch contacts 132, 134, 138 and 140 of the magnetically operated switches 120 and 122, and therefore, upon energization of the relay operating coils 164 and 170, is also connected to the stepping motor windings 106, 106B and 106C. The reset unit 238 provides a reset output to drive all of the stepping motors 94, 94B and 94C simultaneously to zero, clearing the switch assemblies 96, 96B and 96C in a manner to be subsequently described in detail.

Figure 8:
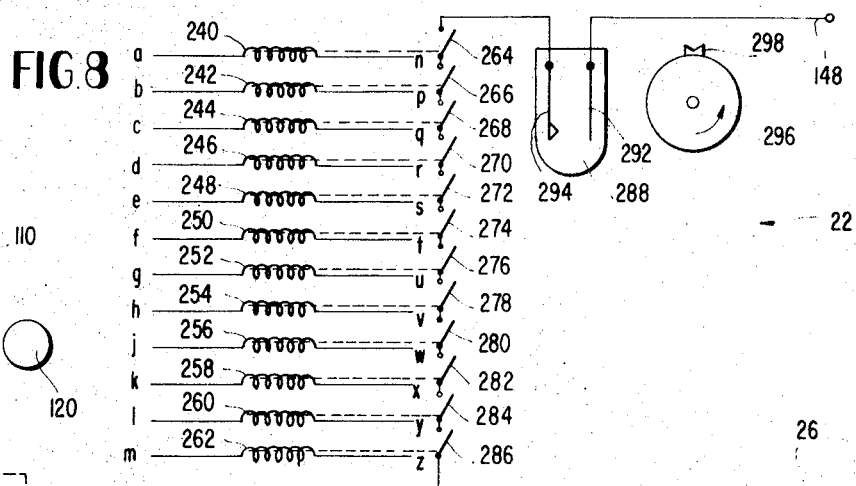
FIG. 8 is a schematic diagram of the comparator unit for the master controlled copy count unit of the present invention.

The comparator unit 22 may best be understood with reference to FIGS. 5 and 8, wherein it will be noted that this unit is designed to sense and compare the signals in the memory unit 20 with those in the copy count unit 24. Basically, the comparator unit consists of a number of relays, each of which has a relay operating coil connected between a printed circuit switch output in the copy counter unit 24 and an SCR anode in the memory unit 20. More specifically, the relays include operating coils 240—262 which are connected to operate relay switch arms 264—286 respectively. Each of the relays operates in exactly the same manner, so for purposes of description the relay coil 240 which extends between the $a$ output in the switch assembly 96 of the units decade 88 of the copy counter and the $n$ output in the units decade 82 of the memory unit will be considered.

The relay which includes the coil 240 and the switch 264 is a normally closed relay, so that the switch 264 closes to complete a circuit when the relay coil 240 is deenergized. To deenergize the relay, the signal at the $a$ output end of the coil 240 and the signal at the $n$ output of the coil must be identical, for otherwise a voltage will be applied across the coil to hold the switch 264 in the open position indicated in FIG. 8.

Each of the coils 240—262 is connected between a printed circuit switch output in the switch assemblies 96, 96B and 96C and the anode output of a corresponding SCR in the decades 82, 84 and 86 which represents the same binary digit in the same decade. Thus, if the output $n$ of the SCR 70 indicates a stored binary zero, and the output $a$ of the switch assembly 96 indicates a binary one, or vice versa, the coil 240 will be energized to hold the switch 264 open. However, when the same binary indication appears at the outputs $a$ and $n$, the coil 240 will deenergize and the switch arm 264 will close completing a circuit.

When the binary outputs at the output terminals $a, b, c, d, e, f, g, h, i, j, k, l$ and $m$ correspond with the binary signals stored in the individual decades of the memory unit 20, all of the coils 240—262 will be deenergized and the switches 264—286 will close. A circuit will thereby be completed between a magnetically operated switch 288 and the output line 26.

The magnetic reed switch 288 includes a stationary contact 292 which is connected to a suitable voltage source, such as the voltage source 148, and a movable magnetically operated switch arm 294 which is electrically connected to the circuit composed by the switches 264—286. The switch 288 is controlled by a rotating actuator 296 which carries a switch operating magnet 298. This switch actuator may be connected to the blanket cylinder shaft 32a or otherwise driven by the blanket cylinder 32 so that the magnet 298 completes one cycle of rotation and passes the switch 288 once for each rotation of the blanket cylinder. The magnet 298 is positioned upon the actuator 296 so that it passes the switch 288 at the end of each cycle of rotation of the blanket cylinder and, at this point, operates to close the circuit between the switch arm 294 and the stationary contact 292. Thus, at the end of each cycle of rotation of the blanket cylinder, a signal from the source 148 will be applied to the circuit composed by the switches 264—286, and when all of the switches are closed, an output control signal will pass to output line 26. The output control or end cycle signal at the output line 26 is fed to trigger an end cycle control unit in the programming system 54a for the offset duplicating machine 28. This terminates the sheet feeding and printing cycle of the machine and, normally, such programming systems operate to automatically initiate a postduplicating phase of operation for the machine. Also, this output signal may be employed to trigger the reset unit 238 directly, or alternatively, the reset unit may be operated in response to the normal program control system for the duplicating machine.

The basic function of the reset unit 238 is to provide a series of reset drive pulses to the stepping motors 94, 94B, and 94C similar to the pulses provided to the stepping motors during normal counting, but preferably, these reset drive pulses are furnished at an increased frequency. It is therefore necessary for the reset unit to constitute a pulse frequency source which may alternatively be formed by an electrical or mechanical switching system.

Referring to FIG. 9, the reset unit 238 is illustrated as a mechanical switching system which is controlled by the control counter 54 of the offset duplicating machine 28. In the operation of the reset unit of FIG. 9, the end cycle pulse at the output line 26 of FIG. 5 causes the programming system 54a to terminate the sheet feeding and printing cycle of the duplicating machine and machine programming continues under the control of the control counter 54. The counter 54 subsequently operates a cam 300 which contacts and closes a cam control switch 302 to complete a circuit from a power source 304 to a switch operating coil 306 and a solenoid operating circuit 308. The switch operating coil 306, when energized, operates a plurality of ganged switch arms 178, 180, 310, 312, 314, 316, 318, and 320. The normally open switch arms 178 and 180 of the ganged reset switch 176 function, when closed by the coil 306, in the manner previously described. Additionally, the coil 306 opens a normally closed switch arm 310 to break the anode power circuit 60 to the SCR's 70 in the memory unit while closing the normally open switch arm 312 to complete a power circuit to energize a drive motor 322.

The switch arms 314, 316, 318, and 320 normally contact switch contacts 324, 326, 328, and 330, respectively. In this state, switch arms 314 and 316 complete a circuit to the switch arm 142 of FIG. 6, while switch arms 318 and 320 complete a circuit to switch arm 136. In their normal positions with the switch-actuating coil 306 deenergized, the switch arm 316 completes a circuit from the switch arm 142 through the contact 326 and a switch contact 332 and switch arm 334 of a cam-operated switch 336 to ground, while the switch arm 320 completes a circuit from the switch arm 136 through the contact 330, a switch contact 338 and switch arm 340 of a cam-operated switch 342 to ground. Thus, the switch arms 136 and 142 are normally connected to ground as previously described to achieve a controlled operation of the stepping motors during normal counting.

Upon energization of the switch-actuating coil 306, the switch arms 314, 316, 318, and 320 move into contact with switch contacts 344, 346, 348, and 350 respectively. This completes a circuit from the switch contact 140 through the switch arm 314 to a switch contact 352 of the cam-operated switch 336, while a second circuit is completed from the switch contact 134 through the switch arm 318 to a switch contact 354 of the cam-operated switch 342. Also, circuits are now formed from the switch contact 138 through the switch arm 316 and the switch arm 334 to ground and from the switch contact 132, the switch arm 320, and the switch arm 340 to ground.

The energization of the switch operating coil 306 and the drive motor 322 causes the drive motor to rotate a switch operating cam 356 for the cam-operated switches 336 and 342. This cam rapidly oscillates the switch arms 334 and 340 between the contacts 332 and 352 and 338 and 354 to cause power to be simultaneously supplied in the proper operating sequence to the windings of the stepping motors 94, 94B, and 94C in the manner previously described in connection with FIG. 6. Actually, the cam-operated switches 336 and 342 operate in the same manner to control the stepping motor windings as did the magnetically operated switches 120 and 122 of FIG. 6, but due to the rapid rotation of the cam 356, the operational sequence provided by the cam-operated switches is much more rapid than that provided by the magnetically operated switches. Also, due to the closing of the reset switch 176, the cam-operated switches 336 and 342 operate all of the stepping motors simultaneously.

The rotation of the stepping motors 94, 94B, 94C under the control of the reset unit 238, drives the printed circuit switch assemblies 96, 96B, 96C simultaneously toward a zero or initial counting position. The actual physical zeroing of the printed circuit switch assemblies may best be understood with reference to FIG. 10, wherein a portion of one of these switch assemblies is indicated.

With reference to FIG. 10, it will be noted that the switch assembly includes a housing 358 within which is rotatably mounted a driven contact making disc 360. Disc 360 carries printed circuit switches 98 on one face thereof, and upon rotation of the disc by its associated stepping motor, these printed circuit switches selectively contact various switch contacts 100 (not shown) in a manner known to the art to make and break the circuits to the switch contacts.

Projecting from the surface of the disc 360 is an index pin 362 which marks the zero point on the contact disc. The index pin normally permits the disc 360 to rotate freely, and operates only during the zeroing of the printed circuit switch assembly to prevent further rotation of the disc after the zero point is reached. This is accomplished when the switch 302 is closed by the cam 300 to energize the circuit 308 which in turn supplies power to a solenoid 364. The solenoid controls a reciprocating stop 366 which moves into the path of the index pin 362 upon energization of the solenoid. Thus, during the reset operation, the stepping motor rotates the disc 360 until the index pin 362, contacts the stop 366 at the zero switching point, and further rotation of the disc 360 is thereby precluded. The stepping motors is no more than a few times greater than the torque required to rotate the disc, and thus, when the zero position is reached, the stepping motor is stalled. However, the stepping motor can withstand this condition without overheating or otherwise sustaining damage.

The switch operating cam 300 is so proportioned that it maintains the switch 302 in the closed position for a time sufficient for the stepping motors to zero all of the switch assemblies. However, when this cam completes its cycle of rotation, the switch 302 is again opened and the circuit is broken to the switch operating coil 306 and the circuit 308. Resetting of the master controlled copy count unit is now complete, and a new master may be sensed.

It will be apparent that for some applications, the duplicating machine 28 may not include a control counter 54 of a type suitable to operate the cam 300, and in such cases, it may be desirable to trigger the reset unit 238 directly by use of the reset pulse on the output line 26. To facilitate this mode of operation, a circuit similar to that illustrated in FIG. 11 may be employed.

Referring to FIG. 11, it is generally desirable to delay the end cycle pulse to the reset unit 238 to permit the pulse to first reach the programming system 54a, for otherwise, too rapid a response from the reset unit could result in undesirable system oscillation. Therefore, the signal on the line 26 is passed to a delay unit 368, which may constitute a delay relay or a capacitive delay circuit. The output from the delay unit energizes a switch operating coil 370, which operates to bring two switch arms 372 and 374 into contact with two pairs of switch contacts 376 and 378 respectively. With the bridging of the switch contacts 376 by the switch arm 372, a circuit is completed from the power source 304 to a motor 380, which in turn drives the switch operating cam 300. It will be noted in FIG. 11 that the switch-operating cam is motor driven instead of counter driven as was the cam of FIG. 9. The cam 300 then operates to close the switch 302 and complete the circuit from the power source 304 to the switch operating coil 306 and the circuit 308 in the manner previously described in connection with FIG. 9. Additionally, a second switch 382 is ganged to the switch 302 and closes simultaneously therewith to complete a holding circuit from the power source 304 across the switch arm 374 to the switch operating coil 370. Therefore, the coil 370 remains energized through the holding circuit after the end cycle signal on the output line 26 is terminated by the switch 288 of FIG. 5.

With the coil 306 in FIG. 11 energized, the reset circuit 238 of FIG. 9 is operated in exactly the same manner as previously described, and when the cam 300 of FIG. 11 completes its cycle of rotation, the holding circuit across the switch arm 382 as well as the power circuit across the switch 302 is broken.

Although a mechanical reset unit 238 has been illustrated in FIG. 9, it is quite obvious that this unit can be replaced by an electrical multivibrator circuit of a type well known to the electrical art. For example, a transistor astable multivibrator which drives a bistable multivibrator from each side thereof may be used. Each such bistable multivibrator then drives a pair of transistor switches to provide four outputs in quadrature to pulse the stepping motor coils in exactly the same manner as the cam-operated switching unit employed in FIG. 9.

The master controlled copy count unit of the present invention may incorporate control circuitry having a number of different forms, and is not limited to the specific memory, sheet counter and comparator circuits previously described. For example, the separate memory circuit and sheet counter employed in FIG. 1 might be eliminated by a counter which serves as both a duplicator sheet counter and a memory unit. This could be accomplished by using a binary-coded decimal transistorized or integrated circuit counter which is preset to the desired binary count by the outputs from the amplifiers 68 for the photodiodes 56 of FIG. 4. The output from the amplifiers 68, instead of being connected to provide a gating pulse to the SCR's 70 forming the memory unit 20, may instead be fed into a binary coded decimal counter circuit, as illustrated by FIG. 12.

Referring more particularly to FIG. 12, a binary coded decimal counter circuit is indicated generally at 384. This counter circuit includes a units decade counter stage 386, a tens decade counter stage 388, and a hundreds decade counter stage 390 which may be formed by any one of a number of known binary coded decimal counter units, transistorized or otherwise. Each of the counter stages 386, 388 and 390 has input lines 392 which are connected to the outputs of the amplifiers 68 of FIG. 4 to receive binary signals therefrom which are indicative of the code 16 provided upon the master sheet 14. The signals on the input lines 392 set the counter 384 for the desired decimal count.

The counter decades 386, 388 and 390 are interconnected in a conventional manner to permit counting to progress through successive decades, and the outputs from each decade are transmitted over a plurality of decade output lines 394 to an AND gate 396. Thus, when each of the counter decades 386, 388 and 390 has reduced the preset binary count to zero, the AND gate will pass an output signal to the line 26 to provide an end cycle signal for the purposes previously described. This countdown of the counter 384 is accomplished by pulses fed into the counter by means of an input line connected to a suitable copy sheet sensing unit 398 on the duplicating machine. Such copy sheet sensing units are well known in the duplicator art and operate to provide an electrical pulse each time a copy sheet passes through the duplicating machine.

The counter 384 of FIG. 12 illustrates a method whereby a sheet counting mechanism may be electrically preset directly from the code carried by the master sheet 14 to control a subsequent counting of copy sheets during the duplicating operation of the duplicating machine. It is similarly possibly, through electrical or electromechanical circuit means to directly preset an electrical or mechanical sheet counter of the type employed as the control counter 54 in FIG. 2 to program the offset machine 28 or similar duplicating machines. Two preferred embodiments of direct counter setting systems of this type for use in the master controlled copy count unit of the present invention are illustrated by FIGS. 13 and 14. These systems eliminate the need for the separate sheet counter 24 of FIG. 1, which is adapted for use with a programming system which might also include the control counter 54.

Referring particularly to FIG. 13, it will be noted that the individual photodiode circuits within the sensing head 18 of FIG. 4 have been modified so that the photodiode 56 is connected to a transistor switch 400, rather than to the amplifier 68. This transistor switch is a conventional transistor switch having an emitter electrode 402, a base electrode 404, and a collector electrode 406 biased by a series resistor 408. When a code mark 16 passes beneath the light source 58 and the photodiode 56 to cause a change in the resistance of the photodiode, the voltage potential developed across the photodiode and a series resistor 410 changes to alter the potential at the base electrode 404 of the transistor switch 400. This in turn alters the conductive state of the transistor switch in a manner well known to the art, and controls the output of the switch taken from a point between the collector electrode 406 thereof and the bias resistor 408. Thus, when the photodiode 56 senses a mark, an output may be taken from the collector of the transistor switch 400, while in the absence of a mark, no output signal will be present at the collector electrode of the transistor switch.

FIG. 13 illustrates only one of the photodiode transistor switch circuits for the sensing head 18, but as previously described in connection with FIG. 4, one of these sensing assemblies is provided within the sensing head for each binary code place on the master sheet 14.

The outputs from the respective transistor switches 400 are then directly fed to a comparator unit 22, and it will be noted that the intervening memory unit 20 of FIG. 1 is eliminated. This is made possible by the fact that the code 16 on the master sheet 14 is sensed continuously during the presetting of the control counter for the associated duplicating machine so that the selective switching of the transistor switches 400 is maintained until the control counter is preset. For purposes of illustration, the operation of the copy count unit of FIG. 13 will be described in connection with the control counter 54 and the programming unit 54a for the offset duplicating machine 28 of FIG. 2.

The comparator unit 22 which receives the coded signals from the transistor switches 400 may be formed by a number of known comparator circuits capable of providing an output control signal when coincidence is achieved between a plurality of input signals. However, for purposes of illustration, the comparator circuit of FIG. 8 in a slightly modified form can be employed to receive the output signals from the transistors 400. For this purpose, it would not be necessary to employ the switch 288 of FIG. 8, but instead, power would be fed directly along the line 148 to the relay switches of the comparator circuit.

The transistor switch output signals would be received by the comparator 22 of FIG. 8 at the terminals $a-m$, while signals for comparison with the transistor output signals would be received at the terminals $n-z$. These second input signals would be provided by a switching unit indicated at 412, which may be similar in construction and operation to the switching assemblies 96, 96B and 96C of FIG. 5. The switching unit 412 may constitute a plurality of printed circuit switches arranged in decades, as illustrated in FIG. 5, to transform a digital input into a binary output. However, the switching unit of FIG. 13 is directly driven by the counter 54, and does not employ the stepping motors 94 of FIG. 5. The individual decade switches forming the switching unit 412 are interconnected in any suitable manner, to cause the switches to progressively count successively by decade until the desired count is reached.

As previously indicated, the switching unit 412 is driven by the control counter 54, such drive being accomplished by means of an electrical or mechanical connection indicated at 414. The control counter 54 for the duplicating machine programming system 54a is preset from a zero position to a desired digital sheet count position by a drive mechanism 416, indicated in FIG. 13 as a ratchet-drive mechanism. This presetting of the control counter 54 causes the switching unit 412 to provide a corresponding binary count output to the comparator 22. Thus, when the signals from the switching unit 412 at the inputs $n-z$ of the relay switches in FIG. 8 correspond to the input signals from the transistor switches 400, the relay circuit operates in the manner previously described in connection with FIG. 8 to provide an output signal on the line 26.

This output signal on line 26 may be forwarded to the programming unit 54a, to cause the programming unit to proceed with the programmed operation of the duplicating machine. For example, upon receipt of the signal from the comparator 22, the programming unit 54a might trigger the master forwarding rollers 44 and 46 of FIG. 2 to cause the master sheet 14 to be fed to the master cylinder 30. Subsequently, the duplicating machine would begin its programmed duplicating run under the control of the counter 54, and the passage of copy sheets through the duplicating machine would cause the counter 54 to countdown from the preset count to zero, at which time the programming unit 54a is triggered to terminate duplicator sheet feeding. In summary, the operation of the master controlled copy count unit of FIG. 13 may be employed to preset the desired copy sheet count into the control counter 54 during the normal programmed run of the duplicating machine 28 of FIG. 2. For this type of operation, the master sheet 16 could be sensed by the sensing head 18 while it rests in the forwarding unit 42 before a duplicating run. This sensing would occur under the control of the programming unit 54a, which would activate, in timed relationship, the light sources 58 and the counter drive unit 416. After activation of the light sources and the counter drive unit, the control counter 54 would be driven from the zero count position until coincidence is reached in the comparator 22. At this point, the control counter would be in a digital sheet count position corresponding with the binary code on the master sheet 14, and an output pulse from the comparator 22 across the line 26 would cause the programming unit 54a to deactivate the counter drive 416.

FIG. 14 illustrates a further embodiment of the master controlled copy count unit of the present invention wherein a direct-drive servosystem is employed to preset the control counter 54 for the duplicating machine in a manner similar to that previously described in connection with FIG. 13. Additionally, the sensing head 18 of FIG. 4 is modified to permit the master controlled copy count unit to achieve a direct voltage to voltage comparison between the sensed code signal from the master sheet and the signal indicative of counter position.

Turning specifically to the master controlled copy count unit of FIG. 14, the sensing head 18 is divided into sensing decades to correspond with the binary code on the master sheet 14, and includes a units decade 418, a tens decade 420, and a hundreds decade 422. These sensing decades incorporate a plurality of photoresistors 424 which are connected in parallel and are arranged to sense the presence or absence of a mark 16 on the master sheet 14 (FIG. 4).

The parallel photoresistors of each sensing decade are connected to a separate voltage source, with the units decade being supplied from a voltage source 426, the tens decade from a voltage source 428, and the hundreds decade from a voltage source 430. The amplitude of the voltage supplied by each of these individual voltage sources varies in accordance with a determined ratio; the units decade being supplied from the voltage source 426 with a voltage V, the tens decade from the voltage source 428 with a voltage 10 V, and the hundreds decades from the voltage source 430 with a voltage 100 V. Thus, when no binary code is placed beneath the sensing head 18, the normal voltage output of each sensing decade is 10 times that of the preceeding sensing decade.

The outputs from the sensing decades 418, 420 and 422 are connected to a common output line 432, which is in turn connected to a summing resistor 434. The combined outputs from the sensing decades are developed across the summing resistor 434, and this potential from the summing resistor is fed from a point 436 to a comparator 438.

The comparator 438 is a conventional voltage to voltage comparator, and operates to compare the potential developed across the summing resistor 434 with the voltage from a voltage source 440 which provides a voltage which is at least equal in amplitude to the normal combined output voltages from the voltage sources 426, 428 and 430. The voltage from the source 440 is developed across a potentiometer 442 at a potentiometer wiper arm 444. The potentiometer wiper arm is connected to a servomotor 446 by a suitable coupling 448 which is also connected to drive the control counter 54 for the duplicating machine 28. This servomotor is also electrically connected to receive an output voltage from the comparator 438.

In the operation of the master controlled copy count unit of FIG. 14, when the control counter 54 is in a zero digital count position, the wiper arm 444 for the potentiometer 442 is in a low voltage position on the potentiometer and a low voltage is fed from the wiper arm to the comparator 438. However, when a master sheet 14 containing a binary code 16 is moved into a sensing position beneath the sensing head 18, the photoresistors 424 pass a voltage to the summing resistor 434 which varies in amplitude in direct proportion to the binary code on the master sheet. This potential, determined by the binary code, is then fed from the point 436 to the comparator 438, and is compared with the voltage from the wiper arm 444. The unbalanced voltage resulting from this comparison is fed from the comparator to drive the servomotor 446, which operates through the connector 448 to move the wiper arm 444 along the potentiometer 442 and to simultaneously cause the control counter 54 to count away from the zero count position. At the digital count of the control counter 54 increases, the voltage furnished to the comparator 438 from the wiper arm 444 also increases, until voltage coincidence is reached in the comparator. At this point, the control counter 54 has reached the desired decimal sheet count position, and the unbalanced output voltage from the comparator is eliminated to deenergize the servomotor 446.

It is obvious that a similar comparison function would occur with the wiper 444 at the high voltage position on the potentiometer if the wiper is moved toward a low voltage position as the counter setting increases. With the control counter preset, the programming circuit 54a can initiate the normal duplicating cycle, and the control counter 54 will count down to the initial zero position as copy sheets are fed into the duplicating machine.

The method of the present invention will be readily understood from the foregoing description relating to the operation of the master controlled copy count unit of the present invention, the construction of which will be readily apparent to those skilled in the art from a consideration of the foregoing description and accompanying drawings. It will be appreciated that this invention provides a master controlled copy count unit which will effectively cause an associated duplicating machine to reproduce automatically varying numbers of copy sheets for each of a plurality of sequential master sheets fed to the machine.

The arrangement and types of components herein may be subject to numerous modifications well within the purview of these inventors who intend only to be limited to a broad interpretation of the specification and appended claims.

I claim:

1. In a duplicating machine including duplicating means for operation during a duplicating cycle of said machine to reproduce information from a master sheet upon individual copy sheets passing through said machine, a master controlled copy count unit for determining the number of copy sheets to receive a reproduction from said master sheet in accordance with a code provided on the master sheet indicating the number of copy sheets to be reproduced therefrom comprising sensing means mounted upon said machine to sense the code on said master sheet and provide an output signal indicative of said sensed code, sheet count means for providing output signals indicative of the number of copy sheets passing through said duplicating machine, and comparison means connected to said sheet count means and said master sensing means, said comparison means operating to compare the output signals from said sheet count means and master sensing means and to provide a control signal to said duplicating machine when said sheet count is equal to the copy number sensed from said coded master sheet.

2. The master controlled copy count unit of claim 1 wherein said code includes a plurality of individual code indications extending across the top, leading edge of said master sheet, said sensing means including a plurality of individual sensing units, each said sensing unit being mounted upon said duplicating machine to sense one of said coded indications.

3. The master controlled copy count unit of claim 1 wherein said sheet count means operates to discontinue output signals upon failure by said duplicating machine to reproduce from said master sheet upon said copy sheets.

4. The master controlled copy count unit of claim 1 wherein said comparison means includes a memory circuit connected to receive and store the output signals from said sensing means and a comparator circuit connected to said sheet count means and said memory circuit, said comparator circuit operating to compare the output signals from said sheet count means with the signals stored by said memory circuit.

5. The master controlled copy count unit of claim 1 wherein said code includes a plurality of individual binary code indications, said sheet count means operating to convert a digital sheet count into a corresponding binary output signal for comparison with said sensing means output signals.

6. In a duplicating machine including duplicating means for operation during a duplicating cycle of said machine to reproduce an image from a master sheet upon individual copy sheets passing through said machine, a master controlled copy count unit for determining the number of copy sheets to receive the image from said master sheet in accordance with a code provided on the master sheet indicating the number of copy sheets to be reproduced therefrom, comprising sensing means mounted upon said machine to sense the code on said master sheet and provide electrical output signals indicative of said code, said sensing means including a plurality of individual sensing units mounted upon said duplicating machine, each said sensing unit being adapted to provide an output electrical signal in response to the presence of a code indication sensed thereby, memory means connected to receive and store the output signals from said sensing means, said memory means including a memory section connected to each of said sensing units to receive and store the output signal therefrom, sheet count means for providing electrical output signals indicative of the number of copy sheets passing through said duplicating machine, said sheet count means including a plurality of sheet count sections equal in number to the number of memory sections in said memory means, each said sheet count section being adapted to provide an output count signal, and comparator means connected to receive and compare the count output signals from said sheet count sections with the signals stored in said memory sections, said comparator means operating to provide a control signal to said duplicating machine when coincidence between said compared signals occurs.

7. The master controlled copy count unit of claim 6 wherein each said memory section includes a controlled rectifier having a gate electrode connected to receive the output signal from said sensing unit, an anode electrode having an output connected to said comparator means and a cathode electrode, said controlled rectifier operating to normally block current flow between said anode and cathode but operating when a signal is received by said gate electrode from said sensing unit to permit substantially free current flow between said anode and cathode electrodes to provide an output signal at said anode output.

8. The master controlled copy count unit of claim 7 wherein said comparator means includes an input power source, an output, switch means connected between said input power source and said output, and electrical switch actuating means connected between said memory and copy count sections, said switch actuating means operating to maintain said switch means in an open position to break the circuit between said input power source and said output when the output signals in said copy count sections are not coincident with the signals in said memory sections, and to close said switch means to complete the circuit between said input power source and said output when coincidence between said signals occurs.

9. The master controlled copy count unit of claim 6 wherein said code includes a plurality of individual binary code indications, said sheet count means operating to convert a digital sheet count into corresponding binary output signals at the outputs of said sheet count sections.

10. The master controlled copy count unit of claim 9 wherein said sheet count means includes switching means in each of said sheet count sections to selectively control the sequence of output signals therefrom, drive means for controlling the operation of said switching means, said drive means being operable to set said switching means to provide binary coded output signals, and sequencing means responsive to the imaging of each copy sheet reproduced by said duplicating machine, said sequencing means operating to control said drive means whereby the binary coded output signals from said switching means are indicative of the number of copy sheets reproduced by said duplicating machine.

11. A method for controlling the copy output produced during the duplicating cycle of a duplicating machine from a master sheet which includes coding the master sheet to indicate the number of copies to be produced therefrom, converting the code on said master sheet to electrical signals indicative thereof prior to said duplicating cycle, and employing said electrical signals to control the number of copy sheets reproduced during said duplicating cycle.

12. The method of claim 11 which includes counting the copy sheets reproduced from said master sheet during said duplicating cycle, said code signal being employed to cause the termination of said duplicating cycle at a copy count indicated by said code.

13. The method of claim 11 wherein said master sheet is coded adjacent the leading edge thereof to facilitate conversion of the code before the duplicating cycle and to prevent reproduction of the code by the duplicating machine.

14. The method of claim 11 which includes producing electrical signals indicative of the digital sheet count indicated by a copy counter for said duplicating machine and comparing said sheet count signals with said electrical code signals.

15. The method of claim 14 which includes coding said master sheet with a binary code, and converting the digital sheet count of said copy counter to corresponding binary sheet count signals.

16. The method of claim 11 which includes employing said electrical signals to control the presetting of a copy counter for a duplicating machine.

17. The method of claim 16 which includes driving said copy counter from a zero sheet count position to increase the sheet count registered thereby, converting the counts indicated by said counter to electrical signals indicative thereof, and comparing the electrical signals indicative of said count with those indicative of said code.

18. The method of claim 17 which includes providing an output control signal upon coincidence between said code and count signals.

19. The method of claim 17 which includes providing an output difference signal derived from the comparison between said code and count signals and employing said difference signal to control drive means for said copy counter.

20. A method for controlling the copy output produced during the duplicating cycle of a duplicating machine from a master sheet which includes coding the master sheet to indicate the number of copies to be produced therefrom, converting the code on said master sheet to electrical signals indicative thereof, counting the copy sheets reproduced from said master sheet during the duplicating cycle of said machine, converting said copy count to electrical signals indicative thereof, comparing the electrical signals indicative of said copy count with those indicative of said code, and providing an output control signal upon coincidence between said code and copy count signals.

21. The method of claim 20 wherein the electrical signals indicative of said code are stored during the increase of said sheet count to provide an electrical signal coincident therewith.

22. A master controlled copy count unit for operation with a duplicating machine copy sheet counter means to control the number of copy sheets to be fed through the duplicating machine during a duplicating cycle thereof in accordance with a sheet count code provided upon a master sheet for said duplicating machine comprising sensing means mounted to sense the code on said master sheet, said sensing means being operative to provide an electrical output indicative of the number of copy sheets shown by said code and control means to receive said electrical output, said control means including means to produce an electrical counter signal indicative of the count on said sheet counter, said control means operating to compare the electrical output of said sensing means with said counter signal to determine when coincidence occurs between such signals.

23. The master controlled copy count unit of claim 22 wherein said sensing means includes a plurality of individual sensing units, each such sensing unit being adapted to sense a corresponding individual code indication on said master sheet.

24. The master controlled copy count unit of claim 23 wherein said code includes a plurality of individual binary code indications, said control means being responsive to the binary code output from said sensing units and digital count position of said sheet counter means.

25. The master controlled copy count unit of claim 24 wherein said control means includes a binary coded decimal counter connected to receive said binary code output from said sensing means, said binary coded counter including decimal count means connected to operate as a copy sheet counter for said duplicating machine, and output means to provide an output control signal when said decimal count means reaches the copy count indicated by said binary code.

26. The master controlled copy count unit of claim 22 wherein drive means are provided to drive said copy sheet counter means from a zero count position toward the sheet count position indicated by said sheet count code.

27. The master controlled copy count unit of claim 26 wherein said individual sensing units are divided into sensing decades, the sensing units in each such decade being connected in parallel with the remaining units in such decade, a voltage supply source for each decade, and output means for developing an output voltage from the sum of the outputs of said sensing decades.

28. The master controlled copy count unit of claim 27 wherein said control means includes voltage comparator means to compare the counter signal with the output voltage from said output means, said comparator means operating to provide an output difference signal, and a counter drive means connected to receive said difference signal, said counter drive means being operative to drive said counter from a zero count position toward the sheet count position indicated by said sheet count code.

29. The master controlled copy count unit of claim 28 wherein said voltage supply sources for said sensing decades provide a voltage to each such decade having an amplitude which is 10 times that of the voltage provided to a preceeding decade.

30. The master controlled copy count unit of claim 28 wherein said means to produce an electrical counter signal indicative of the count on said sheet counter includes a variable resistance circuit means having a power source, a resistor connected to said power source, and a movable wiper for said resistor, said movable wiper being electrically connected to said comparator means and being connected to said drive means whereby said drive means drives both said counter means and said movable wiper.

31. The master controlled copy count unit of claim 22 wherein said code includes a plurality of individual binary code indications, said means to produce an electrical counter signal indicative of the count on said sheet counter operating to convert a digital sheet count indication on said sheet counter into corresponding electrical output signals for comparison with the electrical output of said sensing means.

32. The master controlled copy count unit of claim 31 wherein said sensing means includes a plurality of individual sensing units, each such sensing unit being adapted to sense a corresponding individual binary code indication on said master sheet, said means to produce an electrical counter signal indicative of the count on said sheet counter being operative to convert a digital sheet count on said sheet counter in the corresponding output signals for comparison with said sensing unit.

34. A master controlled copy count unit for operation with a duplicating machine copy sheet counter means to control the number of copy sheets to be fed through the duplicating machine during a duplicating cycle thereof in accordance with a sheet count code provided upon a master sheet for said duplicating machine comprising sensing means mounted to sense the code on said master sheet, said sensing means being operative to provide an electrical output indicative of the number of copy sheets shown by said code, means for applying said electrical signal to preset the counter means at a predetermined level representative of said number of copy sheets, and a copy sheet sensing unit for counting down said counter means from said predetermined level.

UNITED STATES PATENT OFFICE
CERTIFICATE OF CORRECTION

Patent No. 3,562,491                Dated Feb. 9, 1971

Inventor(s) Henry A. Branfield

It is certified that error appears in the above-identified patent and that said Letters Patent are hereby corrected as shown below:

Column 22, line 31, after "unit" insert -- outputs --.

Column 22, after line 31, insert

> 33. The master controlled copy count unit of claim 32 wherein said control means includes comparator means to receive and compare the output signals from said sensing means and said means to produce an electrical counter signal indicative of the count on said sheet counter, said comparator means operating to provide an output control signal upon coincidence between said compared signals.

Signed and sealed this 11th day of April 1972.

(SEAL)
Attest:

EDWARD M. FLETCHER, JR.
Attesting Officer

ROBERT GOTTSCHALK
Commissioner of Patent